US008839675B2

(12) United States Patent
Miller et al.

(10) Patent No.: US 8,839,675 B2
(45) Date of Patent: Sep. 23, 2014

(54) SYSTEM AND METHOD FOR GROUND VIBRATION TESTING AND WEIGHT AND BALANCE MEASUREMENT

(75) Inventors: Mark E. Miller, Des Moines, WA (US); George V. Davis, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 318 days.

(21) Appl. No.: 13/448,789

(22) Filed: Apr. 17, 2012

(65) Prior Publication Data

US 2013/0340511 A1  Dec. 26, 2013

(51) Int. Cl.
| | |
|---|---|
| *G01M 7/06* | (2006.01) |
| *G01L 5/16* | (2006.01) |
| *G01L 1/22* | (2006.01) |
| *G01G 19/07* | (2006.01) |
| *B64F 5/00* | (2006.01) |
| *G01M 7/02* | (2006.01) |
| *G01M 1/12* | (2006.01) |

(52) U.S. Cl.
CPC ............. *B64F 5/0045* (2013.01); *G01M 7/02* (2013.01); *G01M 1/125* (2013.01); *G01G 19/07* (2013.01)
USPC ............. 73/663; 73/583; 244/114 R; 177/146

(58) Field of Classification Search
CPC ..... G01G 19/00; G01G 19/02; G01G 19/021; G01G 19/07; B64F 5/0045; G01M 1/125; G01M 7/00
USPC .............. 177/146; 73/65.05, 65.06, 583, 663; 244/114 R
See application file for complete search history.

(56) References Cited

U.S. PATENT DOCUMENTS

| | | | | | |
|---|---|---|---|---|---|
| 346,771 | A | * | 8/1886 | Phillips | 267/71 |
| 2,754,107 | A | * | 7/1956 | Walter et al. | 177/211 |
| 2,806,686 | A | * | 9/1957 | Miller, Jr. | 177/146 |
| 3,119,598 | A | * | 1/1964 | Petersen et al. | 254/93 R |
| 3,571,550 | A | * | 3/1971 | Rose et al. | 219/767 |
| 4,385,527 | A | * | 5/1983 | Raskin | 73/862.044 |
| 4,502,555 | A | * | 3/1985 | Gower | 177/25.14 |
| 4,889,202 | A | * | 12/1989 | Bron | 177/134 |
| 4,986,391 | A | * | 1/1991 | Salmon | 187/411 |
| 6,128,951 | A | | 10/2000 | Nance | |
| 6,323,442 | B1 | * | 11/2001 | Jones | 177/132 |
| 6,619,127 | B2 | | 9/2003 | Miller | |
| 7,967,244 | B2 | | 6/2011 | Long | |
| 2010/0119343 | A1 | | 5/2010 | Groves | |

OTHER PUBLICATIONS

Wikipedia, "Strain Gauge," retrieved on Apr. 7, 2012.
Transducer Techniques, Inc., "THD Load Cell Overview," retrieved on Apr. 6, 2012.

\* cited by examiner

*Primary Examiner* — Randy W Gibson

(57) ABSTRACT

An apparatus for lifting an aircraft may include a plurality of lifting mechanisms mounted on a supporting surface. Each lifting mechanism may be configured to impart an upward force on a component of the aircraft for lifting the aircraft off the supporting surface. The apparatus may include a beam structure configured to be mounted to the lifting mechanisms. The apparatus may also include a lifting beam suspended from the beam structure. A measurement device may be mounted to the lifting beam and may be configured to engage a jack point associated with the component to determine a weight of the aircraft when the aircraft is lifted off the supporting surface.

13 Claims, 8 Drawing Sheets

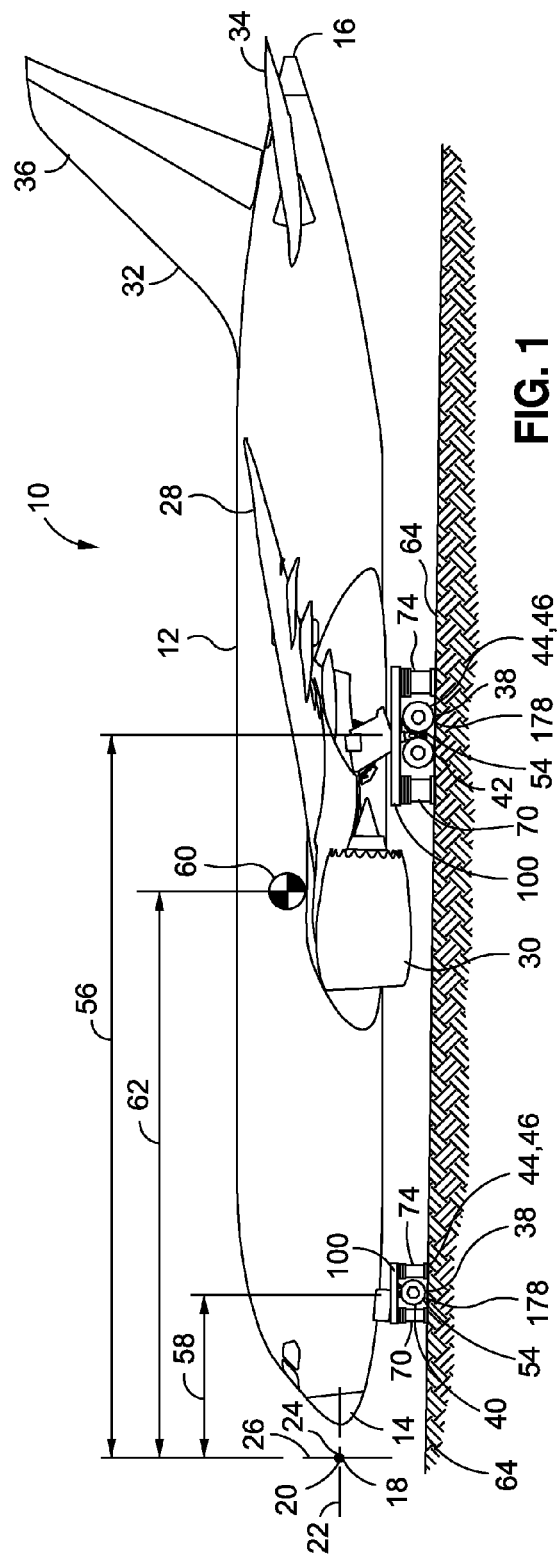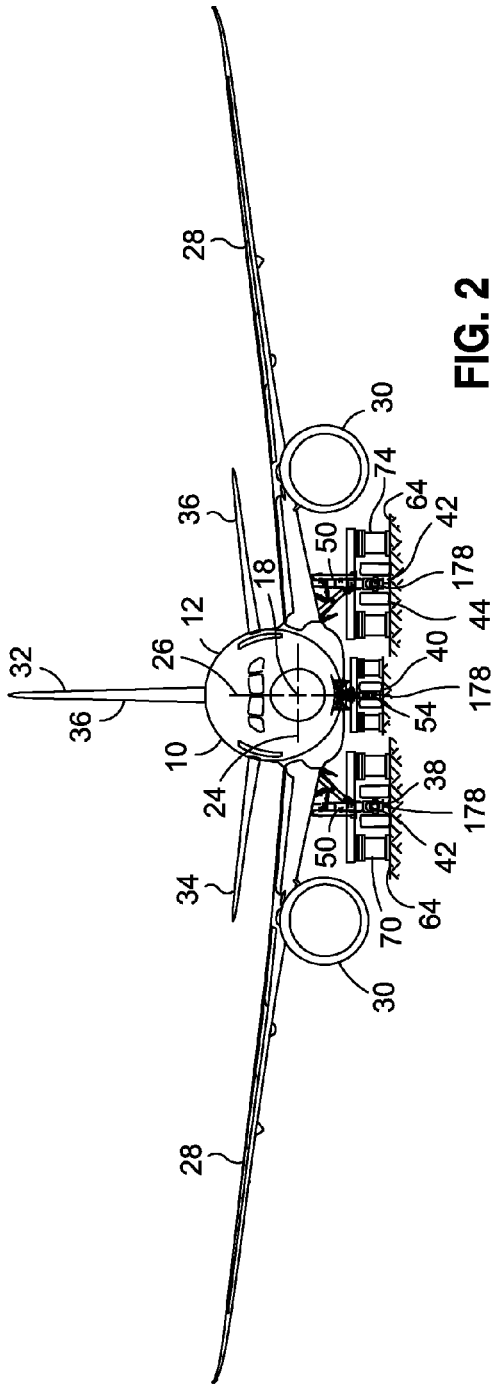

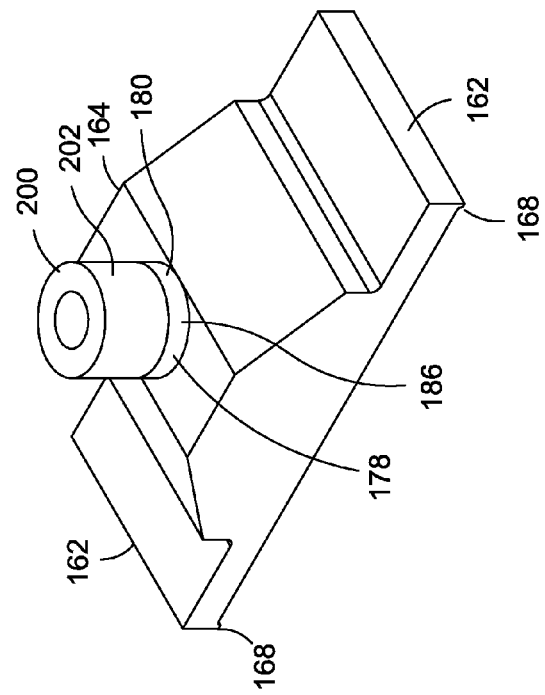
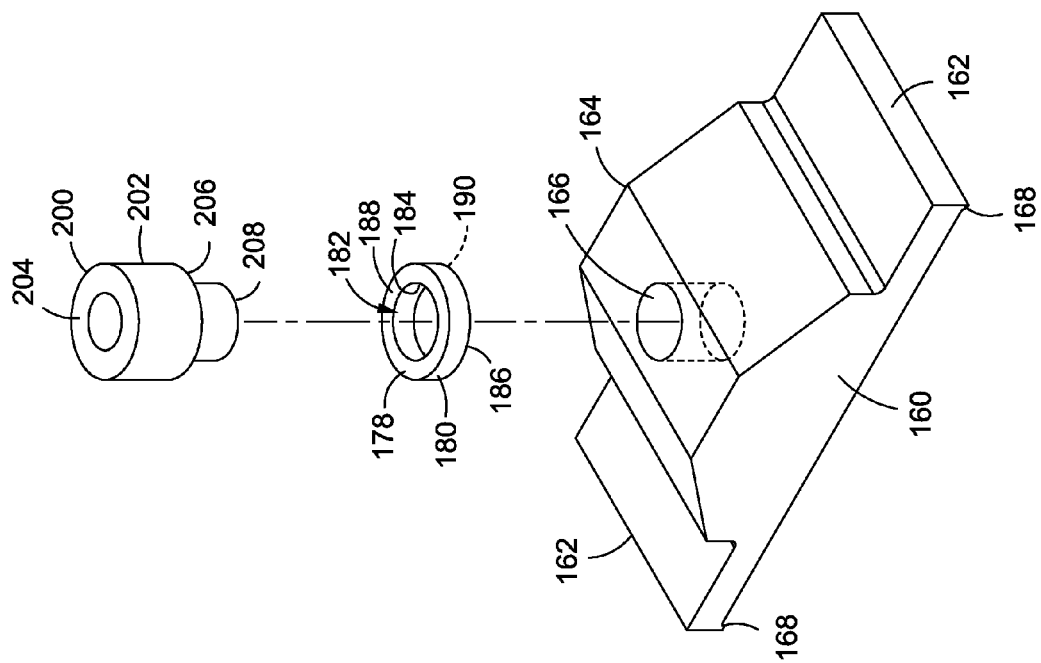

SYSTEM AND METHOD FOR GROUND VIBRATION TESTING AND WEIGHT AND BALANCE MEASUREMENT

FIELD

The present disclosure relates generally to measurement systems and, more particularly, to a system and method for determining the weight and balance of an aircraft.

BACKGROUND

Ground vibration testing of an aircraft is performed to determine the vibration characteristics of the aircraft and to confirm that the aircraft is free from flutter under normal operating conditions. During ground vibration testing, electro-dynamic shakers may be coupled to the aircraft to provide excitation input (e.g., vibration) to the aircraft. The dynamic response of the aircraft to the excitation input may be measured using sensors (e.g., accelerometers) mounted at various locations on the aircraft. The dynamic response may be compared to a structural dynamic analysis of the aircraft for determining the frequency and damping characteristics of the aircraft. The results of the comparison may be used to validate and/or refine the structural dynamic analysis model.

Prior to placing the aircraft in service, it is also necessary to determine the weight of the aircraft for certification of the aircraft. In addition, it is necessary to determine the location of the center of gravity of the aircraft for certification purposes. The determination of the weight and balance (i.e., the location of the center of gravity) of the aircraft is also necessary to determine the operating characteristics of the aircraft including, but not limited to, fuel consumption, rate of climb, and the controllability characteristics of the aircraft.

In conventional practices, the weight and balance of an aircraft is determined prior to performing the ground vibration testing. In one method, the weight and balance is determined by rolling the aircraft landing gear up ramped surfaces and onto scales, recording a weight readout at each landing gear, and then rolling the aircraft off the scales and back down the ramped surfaces. Unfortunately, the process of rolling an aircraft onto and off of scales and recording the weight at each scale is time-consuming. For example, the process of rolling a large commercial aircraft up the ramped surfaces onto a set of scales, recording the weight measurement at each scale, and then rolling the aircraft back off the scales and down the ramped surfaced can take up to 12 hours or longer. In addition, the process of rolling the aircraft up and down the ramped surface poses a level of risk of damage to the aircraft. Furthermore, the lengthy amount of time required to perform a conventional weight and balance analysis of an aircraft adds to the production time because the production of a commercial aircraft is typically not considered to be complete until the weight and balance have been performed.

As can be seen, there exists a need in the art for a system and method of performing the weight and balance of an aircraft in a reduced amount of time. In addition, there exists a need in the art for a system and method of performing the weight and balance of an aircraft which minimizes the level of risk of damage to the aircraft.

SUMMARY

One or more of the above-noted needs associated with performing the weight and balance of an aircraft are specifically addressed by the present disclosure which provides an apparatus for lifting an aircraft using a plurality of lifting mechanisms mounted on a supporting surface. Each lifting mechanism may be configured to impart an upward force on a component of the aircraft for lifting the aircraft. The apparatus may include a beam structure configured to be mounted to the lifting mechanisms. The apparatus may also include a lifting beam suspended from the beam structure. A measurement device may be mounted to the lifting beam and may be configured to engage a jack point associated with the component to determine a weight of the aircraft when the aircraft is lifted off the supporting surface.

In a further embodiment, disclosed is an apparatus for supporting an aircraft for ground vibration testing. The apparatus may include a plurality of pressure canisters supported on a supporting surface. The apparatus may also include a pair of hanger beams. Each hanger beam may extend between a pair of the pressure canisters. A hanger rod may extend downwardly from each one of the hanger beams. The apparatus may also include a lifting beam having opposing ends coupled to a pair of the hanger rods. A compression load cell may be mounted to the lifting beam and may be interposed between the lifting beam and a jack point of the landing gear. The load cell may be configured to provide an indication of a weight of the aircraft when the aircraft is lifted off the supporting surface.

Also disclosed is a method of ground vibration testing of an aircraft. The method may include the steps of engaging the aircraft with a plurality of measurement devices. Each one of the measurement devices may be coupled to at least one lifting mechanism engaged to a jack point of the aircraft. The method may further include lifting the aircraft off of a supporting surface using the lifting mechanisms and determining a weight of the aircraft based on outputs of the measurement devices. The method may additionally include performing a ground vibration testing of the aircraft.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a side view of an aircraft having a lifting apparatus coupled to each landing gear of the aircraft;

FIG. 2 is a front view of the aircraft and the lifting apparatuses located at each landing gear;

FIG. 7 is an exploded perspective view of an embodiment of the bearing block and a compression load cell located between a jack fitting and the bearing block;

FIG. 8 is a perspective view of the bearing block, the load cell, and the jack fitting in an assembled state;

DETAILED DESCRIPTION

Figure 3:
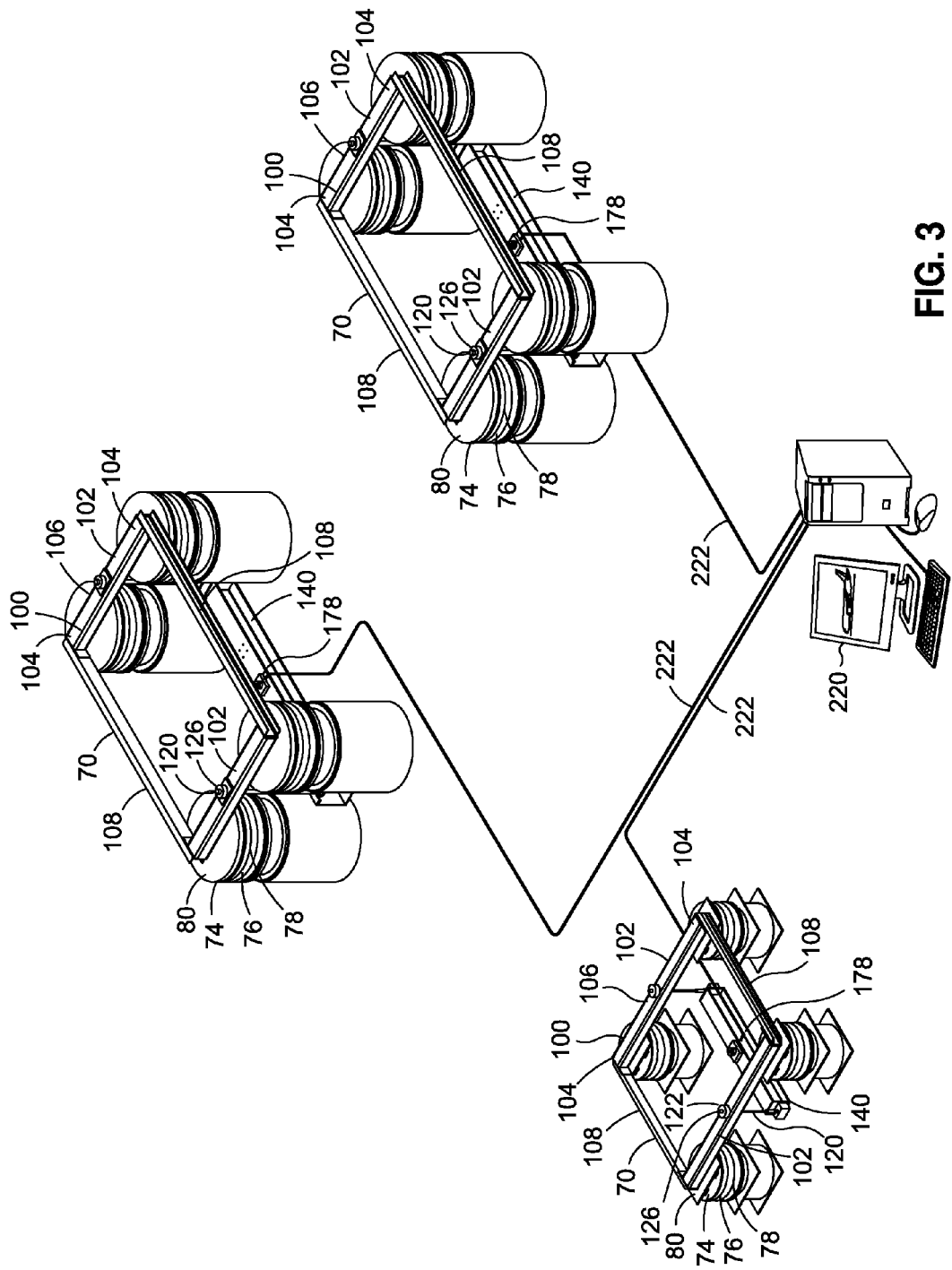
FIG. 3 is a perspective view of an embodiment of the lifting apparatuses at the main landing gear and at a nose landing gear wherein each lifting apparatus may include a weight measurement device coupled to a computer for determining a weight and balance of the aircraft.

Referring now to the drawings wherein the showings are for purposes of illustrating preferred and various embodiments of the disclosure, shown in FIG. 1 is side view of an aircraft 10 having one or more apparatuses 70 surrounding the landing gear 40, 42 of the aircraft 10 for lifting the aircraft 10. The aircraft 10 may be defined with regard to a reference coordinate system 20 having a longitudinal axis 22, a lateral axis 24, and a vertical axis 26 wherein each axis 22, 24, 26 is oriented orthogonally relative to one another. The longitudinal axis 22 may extend between a forward end 14 and an aft end 16 of the aircraft 10. The reference coordinate system 20 may be coincident with an arbitrary datum point 18 which may be used as a reference for establishing the location of a center of gravity 60 of the aircraft 10.

The aircraft 10 may include a fuselage 12 extending from a nose at the forward end 14 to an empennage 32 at the aft end 16. The empennage 32 may include one or more tail surfaces such as a vertical stabilizer 36 and/or a horizontal stabilizer 34 for directional control of the aircraft 10. The aircraft 10 may further include a pair of wings 28 and one or more propulsion units 30. The aircraft 10 may be supported by landing gear 40, 42 on a supporting surface 64 such as a shop floor or an airport tarmac. In FIG. 1, the aircraft 10 is supported by a tricycle landing gear comprising two (2) main landing gear 42 and a nose landing gear 40. However, the apparatus 70 disclosed herein may be implemented on aircraft 10 having any landing gear configuration.

It should also be noted that although the apparatus 70 of the present disclosure is described in the context of a fixed wing passenger aircraft such as the aircraft 10 illustrated in FIG. 1, the apparatus 70 may be implemented for performing a weight and balance and/or for conducting ground vibration testing on aircraft of any configuration. In this regard, the apparatus 70 may be implemented for performing a weight and balance and conducting ground vibration testing of any fixed-wing aircraft 10 and any rotorcraft of any configuration, without limitation, including any civil, commercial, or military aircraft or rotorcraft. Even further, the apparatus 70 may be implemented for performing a weight and balance and/or conducting vibration testing of any type of structure including any vehicular or non-vehicular structure and is not limited to use with aircraft or rotorcraft.

In FIGS. 1-2, a component of the aircraft 10 such as a landing gear 40, 42 may be lifted by one of the apparatuses 70. Each apparatus 70 may include a plurality of lifting mechanisms 74. The lifting mechanisms 74 may be arranged, constructed, or assembled around each landing gear 40, 42. In the embodiment shown, each one of the main landing gear 42 may have four (4) of the lifting mechanisms 74 arranged in an orthogonal or symmetrical pattern around the main landing gear 42. Likewise, the nose landing gear 40 may include four (4) of the lifting mechanisms 74 arranged in an orthogonal pattern around the nose landing gear 40. As described in greater detail below, each apparatus 70 may further include at least one measurement device 178 configured to provide an indication of a portion of the weight of the aircraft 10 when the aircraft 10 is lifted off of the supporting surface 64 (e.g., a shop floor) by the lifting mechanisms 74.

Referring to FIG. 3, shown is an arrangement of three (3) apparatuses 70 including one apparatus 70 at each of the two (2) main landing gear 42 and at the one (1) nose landing gear 40 of the aircraft 10 illustrated in FIGS. 1-2. Each apparatus 70 includes a beam structure 100 that may be mounted to or is otherwise supported by the lifting mechanisms 74. In an embodiment, each apparatus 70 may be sized and configured such that each beam structure 100 surrounds a landing gear as shown in FIGS. 1-2. In an embodiment, each lifting mechanism 74 may be configured as a pressure canister 76. The pressure canisters 76 at each landing gear 40, 42 location may be configured to impart an upward force 90 (FIG. 10) on a component 38 (e.g., the landing gear 40, 42) (FIG. 2) of the aircraft 10 for lifting the aircraft 10 off the supporting surface 64. Each pressure canister 76 may be supported by the supporting surface 64 such as the shop floor, an airport tarmac, or other supporting surface 64. Although each landing gear 40, 42 is shown as having four (4) of the pressure canisters 76 mounted therearound, any number of pressure canisters 76 may be provided at each landing gear 40, 42.

Figure 9:
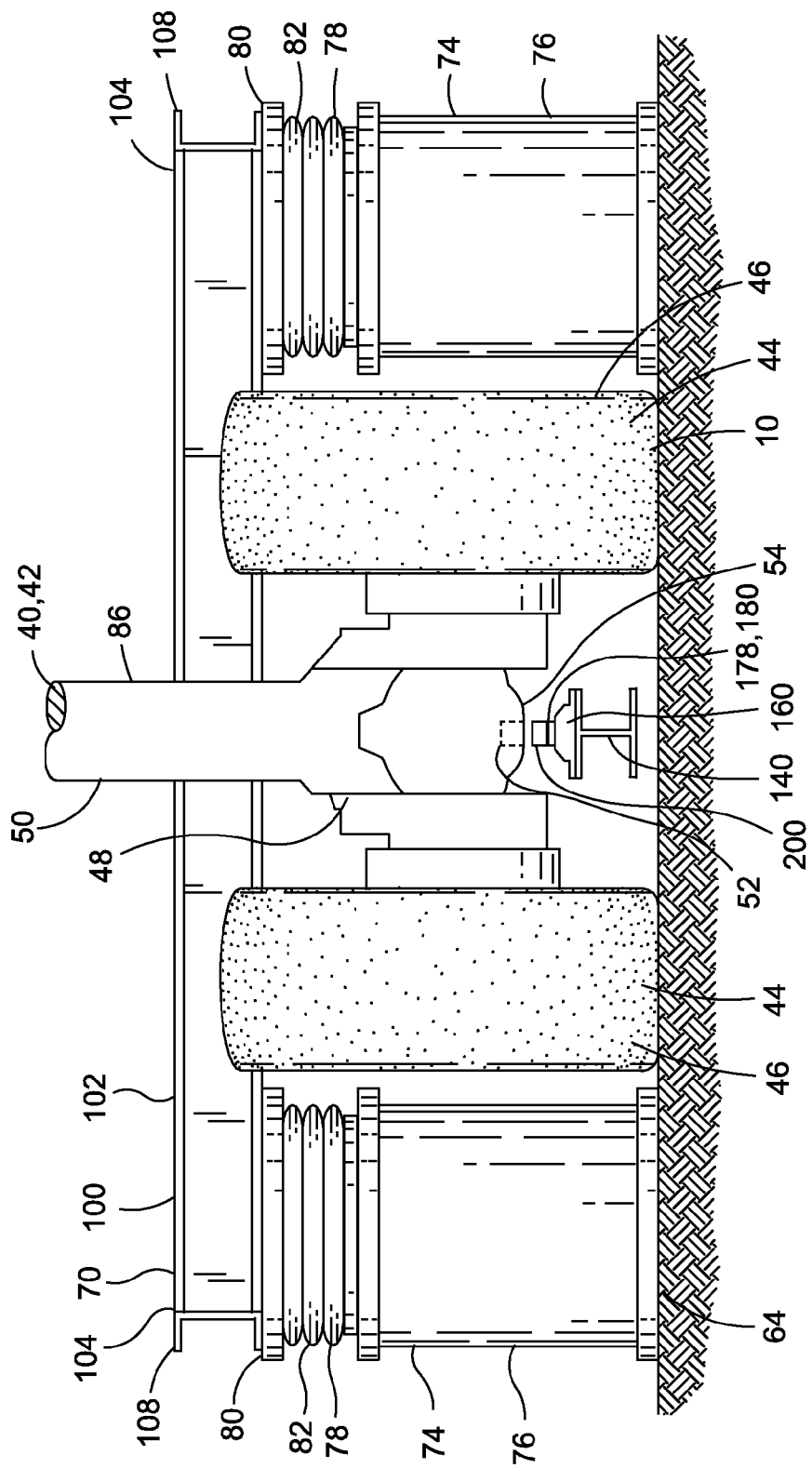
FIG. 9 is a front view of the nose landing gear in a ground position.
Figure 10:
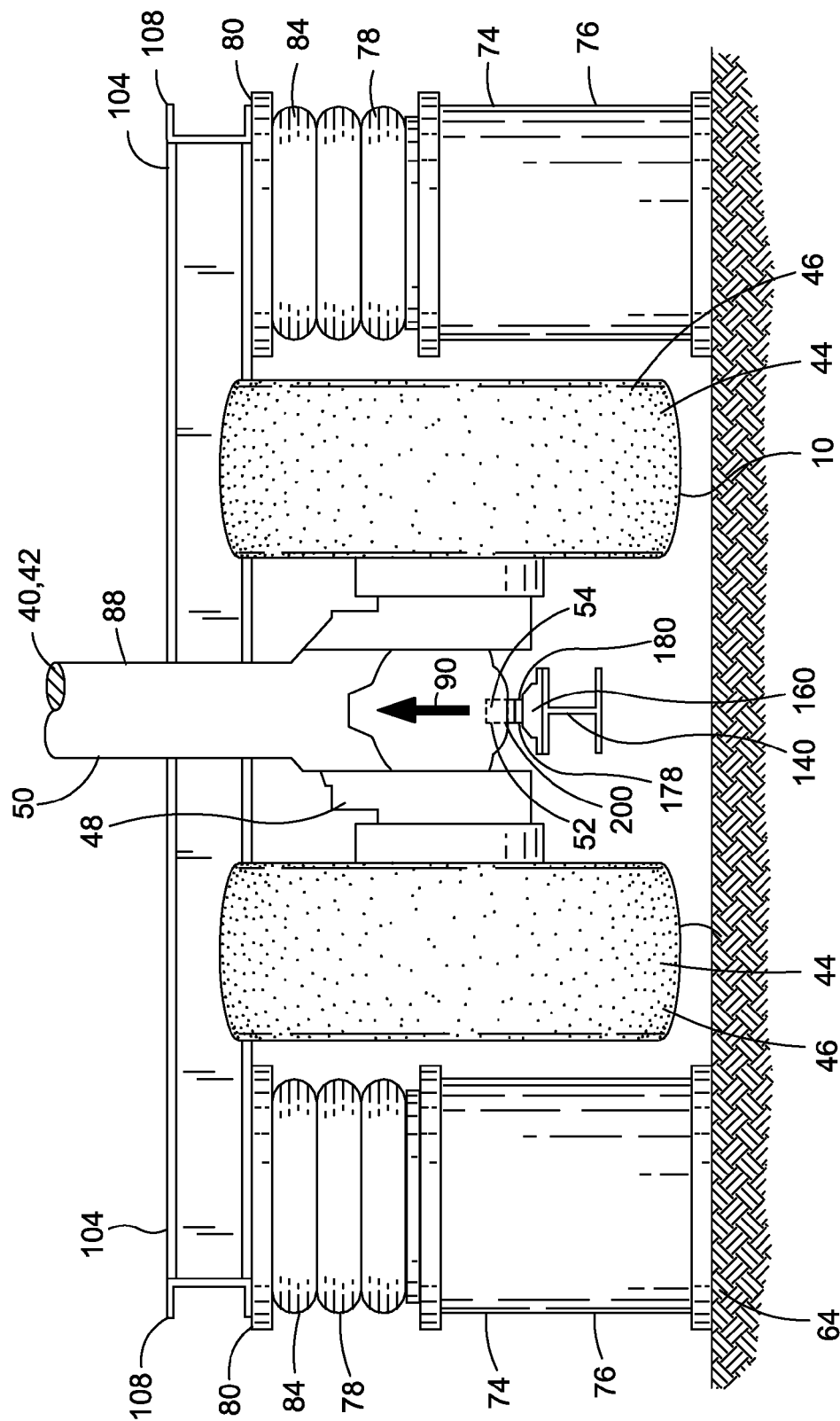
FIG. 10 is a front view of the nose landing gear in a lifted position.

Furthermore, although each apparatus 70 is shown in FIG. 3 as surrounding a landing gear 40, 42 for lifting the aircraft 10 off of the supporting surface 64, the apparatuses 70 may be configured to engage alternative components at other locations on the aircraft 10. For example, the apparatuses 70 may be configured to engage jack points 54 (FIG. 9) located on an underside of the fuselage 12 (FIG. 1), an underside of the wings 28 (FIG. 1), or at other locations of the aircraft 10. In an embodiment, each pressure canister 76 may include a cylinder with a stack of one or more bellows 78 on top of the cylinder. The bellows 78 may be filled with pressurized fluid such as pressurized air (not shown) to inflate the pressure canisters 76 from a deflated position 82 (FIG. 9) to an inflated position 84 (FIG. 10). However, the pressure canisters 76 may be configured to be filled with any type of fluid (not shown) such as water, gas, hydraulic fluid, or any other type of fluid which may inflate the bellows 78 and cause the pressure canisters 76 to impart an upward force 90 (FIG. 10). Although not shown in FIG. 3, each pressure canister 76 may be regulated by a control system (not shown) for providing a predetermined amount of fluid (not shown) to each pressure canister 76 by means of fluid conduits (not shown).

In FIG. 3, each apparatus 70 may include a measurement device 178 which may be mounted to a lifting beam 140 of the apparatus 70. Each measurement device 178 may be configured to measure a portion of the weight of the aircraft 10 (FIG. 1) at the landing gear 40, 42 (FIG. 1). In an embodiment, each measurement device 178 may be located between a lifting beam 140 and a jack point 54 (FIG. 1) on the landing gear 40, 42. Each one of the measurement devices 178 may be communicatively coupled to a computer 220 for storing, processing, and/or displaying the output of each measurement device 178. As described in greater detail below, the computer 220 may process the outputs of the measurement devices 178 and determine the total weight and the center of gravity 60 (FIG. 1) of the aircraft 10.

Figure 4:
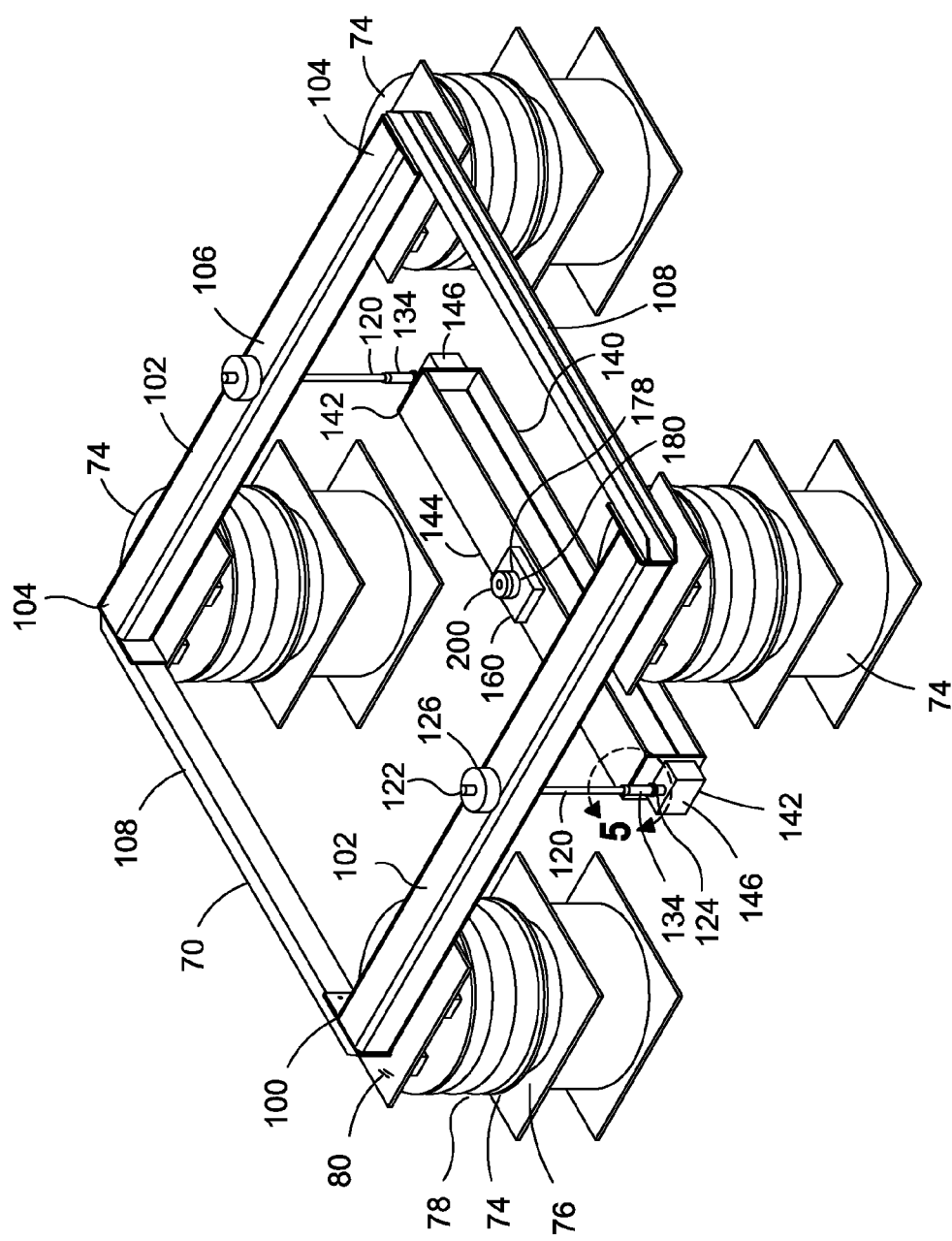
FIG. 4 is a perspective view of an embodiment of a lifting apparatus and a lifting beam suspended by a pair of hanger rods.

In FIG. 4, shown is one of the apparatuses 70 surrounding the nose landing gear 40 (FIG. 1) of the aircraft 10 (FIG. 1). The apparatus 70 includes the beam structure 100 which may be mounted to or supported by the lifting mechanisms 74. In the embodiment shown, the beam structure 100 may comprise a pair of generally parallel hanger beams 102 arranged in spaced relation to one another. Each one of the hanger beams 102 may extend between a pair of the pressure canisters 76. In an embodiment, the ends 104 of each hanger beam 102 may be mounted on the upper surface 80 of one of the pressure canisters 76. Each hanger beam 102 may have an I-beam cross-sectional shape to provide a relatively stiff and high-strength structural member that is resistant to bending under the weight of the aircraft 10. However, the hanger beams 102 may be provided in any one of a variety of different cross sectional shapes for supporting the weight of the aircraft 10.

The pair of hanger beams 102 may be stabilized against lateral motion by racking beams 108. The racking beams 108 may be coupled to the hanger beams 102 such as at the ends 104 of the hanger beams 102 as shown. The racking beams 108 may maintain the spacing between the hanger beams 102 and provide rigidity and stiffness to the beam structure 100. In addition, the racking beams 108 may prevent local twisting of the hanger beams 102 under the weight of the aircraft 10. The racking beams 108 may be mechanically coupled to the hanger beams 102 to allow for assembly and disassembly of the apparatus 70. However, the racking beams 108 may be secured to the hanger beams 102 in any manner such as by welding or by other means.

In FIG. 4, each hanger beam 102 may include a hanger rod 120 having an upper end 122. In an embodiment, each hanger rod 120 may include a puck 126 at the upper end 122 of the hanger rod 120 for pivotably supporting the hanger rod 120. The upper end 122 of each hanger rod 120 may extend through oversized holes (not shown) in the hanger beams 102 to allow the hanger rods 120 to pivot relative to the puck 126. Each one of the hanger rods 120 may be coupled at a lower end 124 of the hanger rod 120 to a lifting beam 140. In this manner, the lifting beam 140 may advantageously be suspended from the hanger beams 102 to allow slight lateral movements of the lifting beam 140 when the aircraft 10 is lifted off of the supporting surface 64 (FIG. 1) as described below. In the embodiment shown, each hanger rod 120 may be coupled to a hanger beam 102 at an approximate midpoint 106 of the hanger beam 102 so that each lifting beam 140 may extend between the wheels 44 of the landing gear 40, 42. In this manner, each lifting beam 140 may be oriented in a fore-aft direction between a side-by-side pair of the wheels 44 of the landing gear 40, 42 as shown in FIG. 9. In such a position, the lifting beam 140 may be generally positioned below a jack point 54 (FIG. 1) of the landing gear 40, 42 as described below.

Figure 5:
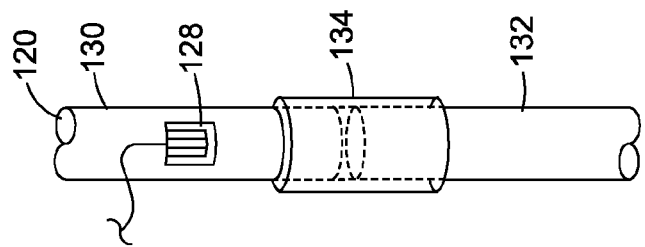
FIG. 5 is an enlarged view of a portion of a hanger rod having a threaded sleeve for adjusting a length of the hanger rod and further including a strain measurement device for measuring axial load in the hanger rod.

Referring to FIG. 5, in an embodiment, each hanger rod 120 may be formed of an upper rod portion 130 and a lower rod portion 132 joined by a threaded sleeve 134. The upper and lower rod portions 130, 132 and the threaded sleeve 134 may be configured such that rotation of the threaded sleeve 134 provides a means for adjusting the length of the hanger rod 120. In an embodiment, the threaded sleeve 134 may include external features (not shown) such as flats for engagement by a tool such as a wrench (not shown) to facilitate manual rotation of the threaded sleeve 134 to change the length of the hanger rod 120. The length of a hanger rod 120 may be adjusted as a means to adjust the orientation or tilt angle of the lifting beam 140 (FIG. 3). For example, the length of a hanger rod 120 may be adjusted such that a lifting beam 140 may be oriented substantially horizontally when the aircraft 10 is lifted off of the supporting surface 64 (FIG. 1). Alternatively, the length of one or more of the hanger rods 120 may be adjusted such that the aircraft 10 (FIG. 1) is oriented in a level-flight attitude during the determination of the weight and balance of the aircraft 10 and/or during ground vibration testing of the aircraft 10.

In a further embodiment, one or more of the hanger rods 120 may include one or more strain measurement devices 128 (FIG. 3) for measuring the load in the hanger rod 120 (FIG. 3) when the aircraft 10 is lifted off of the supporting surface 64 (FIG. 1) as a redundant means to measure the weight of the aircraft and verify the accuracy of the measurement device 178 (e.g., load cell 180) at a jack point 54 (FIG. 1). In an embodiment, the strain measurement device 128 may comprise a strain gauge, a piezo-resistor, a semiconductor gauge, a fiber optic sensor, a capacitive strain gauge, or any other suitable strain measurement device 128 for measuring strain in the hanger rod 120. In an embodiment, one or more strain gauges may be calibrated and then bonded to the hanger rod 120. The strain gauges may be communicatively coupled to the computer 220 (FIG. 3) to provide strain measurements that may be converted into load and compared to the weight (e.g., the load) measurement of the measurement devices 178.

Figure 6:
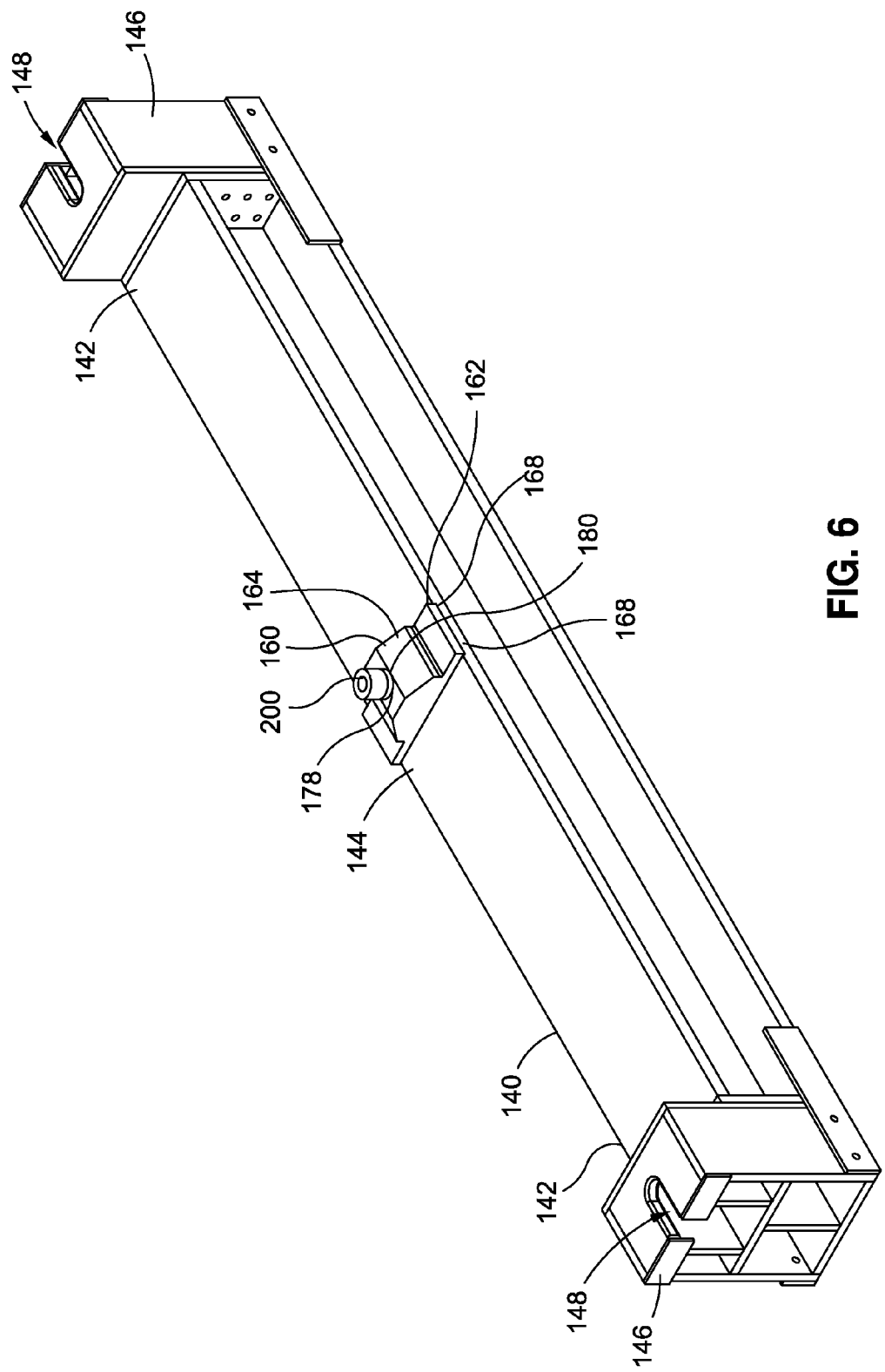
FIG. 6 is a perspective view of an embodiment of a lifting beam having a bearing block for engaging a jack point of the aircraft.

FIG. 6 is a perspective view of a lifting beam 140 having a measurement device 178 mounted to the lifting beam 140. The lifting beam 140 may include opposing ends 142. Each end 142 may include a beam end fitting 146 configured to be coupled to one of the hanger rods 120. In the embodiment shown, each one of the beam end fittings 146 may include a slot 148 for receiving the lower end 124 (FIG. 4) of a hanger rod 120 (FIG. 5). The slot 148 may facilitate pivotal motion of the hanger rod 120 which may prevent the development of moment forces in the lifting beam 140 which may compromise the accuracy of the ground vibration testing and/or the accuracy of the weight and balance measurements. In an embodiment, the lower end 124 of the hanger rods 120 may be coupled to the beam end fitting 146 by a puck 126 in the same manner as is described above with regard to the puck 126 (FIG. 4) located at the attachment of the upper end 122 (FIG. 4) of the hanger rod 120 to the hanger beam 102 (FIG. 4).

FIG. 6 further illustrates a bearing block 160 mounted to an upper surface of the lifting beam 140. Although shown as being located at an approximate midpoint 144 of the lifting beam 140, the bearing block 160 may be located at any position along the lifting beam 140. The bearing block 160 may be configured to support the measurement device 178 in a manner such that the measurement device 178 may provide a weight measurement of the aircraft 10 (FIG. 1) at the landing gear 40, 42 (FIG. 1). In an embodiment, the apparatus 70 may include a jack fitting 200 for engaging a jack point 54 (FIG. 1) on the landing gear 40, 42. As described in greater detail below, the measurement device 178 may be interposed or sandwiched between the bearing block 160 and the jack fitting 200 such that the measurement device 178 is loaded in compression when the aircraft 10 is lifted off of the supporting surface 64 (FIG. 1).

In FIG. 7, shown is an exploded perspective view of the bearing block 160 and illustrating the interconnectivity of the bearing block 160 with the measurement device 178 and the jack fitting 200. The bearing block 160 may include opposing block end portions 162 interconnected by a block center portion 164. The block end portions 162 may each include one or more downwardly-extending tabs 168 or protrusions for aligning or positioning the bearing block 160 relative to the lifting beam 140 (FIG. 6). The tabs 168 may protrude downwardly along the side edges of the lifting beam 140 and prevent lateral motion of the bearing block 160 relative to the lifting beam 140. However, the bearing block 160 is not limited to tabs 168 and may be provided with any positioning mechanism that may facilitate positioning of the bearing block 160 on the lifting beam 140.

The block center portion 164 may have an increased thickness relative to the end portions 162 such that the center portion 164 may support the load measured by the measurement device 178. In an embodiment, a block bore 166 may be formed in the block center portion 164. The block bore 166 may be sized and configured to receive a jack fitting 200. The jack fitting 200 may be configured to engage a jack point 54 (FIG. 1) of the aircraft 10 (FIG. 1). For example, the jack fitting 200 may be configured to fit within a strut bore 52 (FIG. 9) formed in a strut 50 of the landing gear 40, 42 (FIG. 1). The jack fitting 200 may be provided in a generally cylindrical shape or in other shapes that may fit within the strut bore 52. The jack fitting 200 may have an upper surface 204 and a lower surface 206. The upper surface 204 may be in bearing contact with an upper surface (not shown) of the strut bore 52 when the aircraft 10 is in the lifted position 88 (FIG. 10). The jack fitting 200 may include a shaft 208 extending downwardly from the lower surface 206 of the jack fitting 200. The shaft 208 may be sized and configured complementary to the block bore 166 formed in the bearing block 160. For example, the shaft 208 may be sized to provide a slidable fit with the cylindrical walls of the block bore 166.

In FIGS. 7-8, shown is an embodiment of the measurement device 178 that may be coupled to the bearing block 160. The measurement device 178 may be configured as a compression load cell 180 for measuring compression load on the jack fitting 200 under the weight of the aircraft 10. The compression load cell 180 may be configured as an open-hole compression load cell 180. The opening 182 in the load cell 180 may be sized and configured complementary to the jack fitting 200. In this regard, the opening 182 may have an inner diameter 184 that may be sized and configured complementary to the diameter of the shaft 208 of the jack fitting 200. The load cell 180 may further include an outer diameter 186 that is preferably, but optionally, no larger than the outer diameter 202 of the jack fitting 200 such that the load on the jack fitting 200 may be uniformly distributed over the upper surface 188 of the load cell 180. In this manner, the upper and lower surfaces 188, 190 of the load cell 180 may be sandwiched between the jack fitting 200 and the bearing block 160 and may provide relatively accurate weight measurements when the aircraft 10 (FIG. 1) is lifted off of the supporting surface 64 (FIG. 1). However, the load cell 180 may be positioned in direct contact with the jack point 54 (FIG. 1) of the aircraft 10 (i.e., in direct contact with the landing hear 40, 42) and is not necessarily located between the jack fitting 200 and the lifting beam 140 (FIG. 6).

Although the measurement device 178 is shown and described as being an open-hole compression load cell 180, the measurement device 178 may be provided in any one of a variety of different embodiments and is not limited to a load cell 180. In this regard, the measurement device 178 may be provided as a strain measurement device, a fiber optical measurement device, a pressure transducer, a piezoelectric device, or other devices that may directly or indirectly measure weight of the aircraft 10. Furthermore, the measurement device 178 is not limited to being sandwiched between a jack fitting 200 and the lifting beam 140 (FIG. 6). For example, the measurement device 178 may comprise a non-open-hole load cell (not shown) that may be positioned in a recess (not shown) that may be formed in the bearing block 160. In a further embodiment, the load cell 180 may be positioned in a recess (not shown) formed directly in the lifting beam 140 such that the bearing block 160 may be omitted from the apparatus 70 (FIG. 4). However, the measurement device 178 may be provided in any configuration that facilitates measurement of the weight on the lifting beam 140 when the aircraft 10 (FIG. 1) is lifted off of the supporting surface 64 (FIG. 10).

Figure 11:
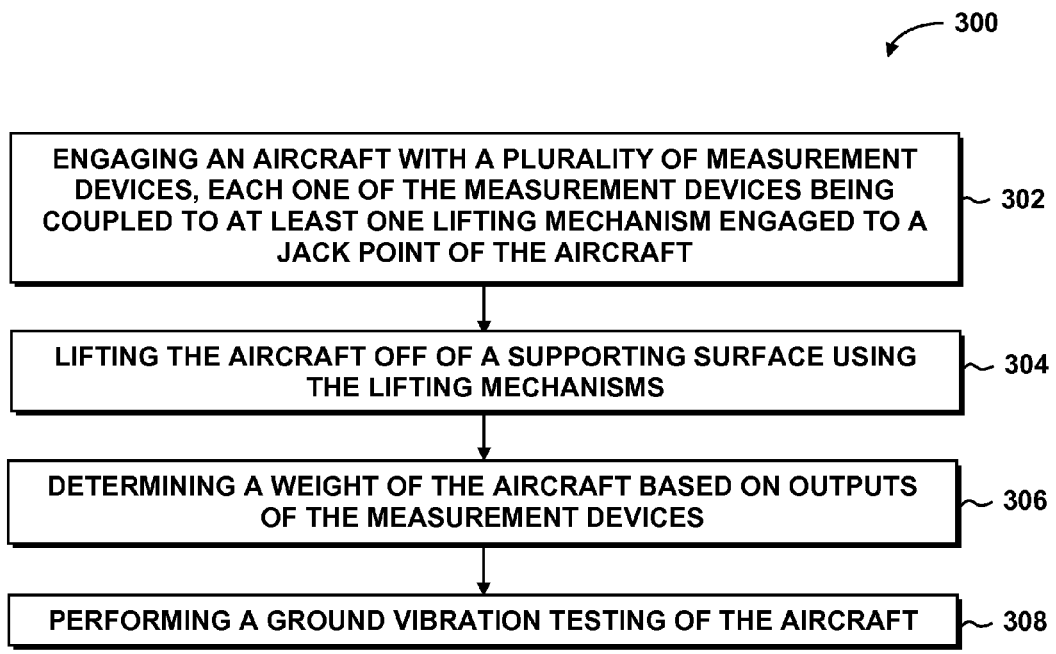
FIG. 11 a flow chart illustrating one or more operations that may be included in a method of determining a weight and balance of an aircraft.

Referring to the flow chart of FIG. 11 with additional reference to FIGS. 9-10, shown in FIG. 11 is a method 300 of ground vibration testing of an aircraft 10 (FIG. 1) and which may include performing a weight and balance analysis of the aircraft 10. Advantageously, by performing the weight and balance analysis in conjunction with the ground vibration testing of the aircraft 10, a significant amount of time may be saved relative to the amount of time required to perform a weight and balance using conventional means such as using floor scales as described above.

Step 302 of the method 300 of FIG. 11 may include engaging the aircraft 10 (FIG. 1) with a plurality of measurement devices 178 (FIG. 9). Each one of the measurement devices 178 may be coupled to at least one lifting mechanism 74 (FIG. 9) located near a jack point 54 (FIG. 9) of the aircraft 10. For example, FIG. 9 is a front view of the apparatus 70 surrounding a landing gear 40, 42 having a jack point 54. The landing gear 40, 42 is shown in a ground position 86 wherein the weight of the aircraft 10 is supported by the wheels 44 of the landing gear 40, 42. The pressure canisters 76 are in a deflated position 82 and the jack fitting 200 is positioned in spaced relation below the strut 50 or axle 48 of the aircraft 10. The landing gear strut 50 may include a strut bore 52 in a lower end of the strut 50 or in the axle 48 of the landing gear 40, 42. The strut bore 52 may comprise the jack point 54 for the landing gear 40, 42. The measurement device 178 may comprise a compression load cell 180 that may be interposed between the bearing block 160 and the jack fitting 200 as shown in FIGS. 7-8 and described above. Each one of the load cells 180 for the apparatuses 70 (FIG. 3) may be communicatively coupled to a computer 220 (FIG. 3) such as by means of hard wiring 222 (FIG. 3) or by wireless means. The computer 220 may receive, process, and store the outputs of the load cells 180.

Step 304 of the method 300 of FIG. 11 may include lifting the aircraft 10 (FIG. 1) off of the supporting surface 64 (FIG. 9) to a lifted position 88 (FIG. 10) using one or more lifting mechanisms 74 (FIG. 10). In an embodiment, the lifting mechanisms 74 may be configured as pressure canisters 76 (FIG. 10) as described above. Each one of the pressure canisters 76 may be coupled to a control system (not shown) which may regulate the amount of fluid (air, water, oil, etc.— not shown) to each pressure canister 76 by means of fluid conduits (not shown). Starting from a deflated position 82 (FIG. 9), the control system may inflate the bellows 78 (FIG. 9) of the pressure canisters 76 to an inflated position 84 (FIG. 10) such that an upward force 90 (FIG. 10) is imparted to each one of the landing gear 40, 42 (FIG. 10). In FIG. 10, the bellows 78 may be inflated in a uniform manner such the aircraft 10 is lifted off of the supporting surface 64 in a level and controlled manner.

In an embodiment, prior to lifting the aircraft 10 (FIG. 1), the length of the hanger rods 120 (FIG. 4) may be adjusted using the threaded sleeve 134 (FIG. 5) described above. Each threaded sleeve 134 may interconnect upper and lower rod portions 130, 132 (FIG. 5) and may be adjustable to allow for adjusting a length of the hanger rod 120 to adjust the orientation of the lifting beam 140 (FIG. 6). For example, a threaded sleeve 134 may be adjusted such that a lifting beam 140 is oriented substantially horizontally and/or such that the aircraft 10 is oriented at a predetermined pitch attitude such as a level-flight attitude when the aircraft 10 is lifted off of the supporting surface 64 (FIG. 10).

Step 306 of the method 300 of FIG. 11 may include determining a weight measurement at each one of the jack points 54 (FIG. 10) when the aircraft 10 is lifted off of the supporting surface 64 (e.g., shop floor, airport tarmac, etc.) (FIG. 10). For example, in FIG. 10, weight measurements may be provided by the compression load cells 180 located at each of the main landing gear 42. Similarly, weight measurements may be provided by a compression load cell 180 located at the nose landing gear 40 (FIG. 10). In an embodiment, the weight measurements provided by each one of the load cells 180 may be verified or checked by measuring the output of one or more strain gauges 128 (FIG. 5) that may optionally be applied to the hanger rods 120 (FIG. 5) as described above. The strain measurements of the hanger rod 120 may be converted to stress by multiplying the strain measurement by a modulus of elasticity of the material from which the hanger rod 120 is formed. The stress can be converted to load by multiplying the stress by the cross-sectional area of the hanger rod 120 at the location of the strain gauge 128. The combined load in the hanger rod 120 at each end 142 (FIG. 6) of a lifting beam 140 (FIG. 6) can then be compared to the weight measurement indicated by the load cell 180 to verify the accuracy of the measurements. The total weight of the aircraft 10 may be determined by adding together the weight measurements recorded by the load cells 180 at each one of the landing gears 40, 42.

The computer 220 may be configured to determine the center of gravity 60 (FIG. 1) of the aircraft 10 (FIG. 1) based on the weight measurements provided by the load cells 180 at each landing gear 40, 42 (FIG. 1). For example, the location of the center of gravity 60 (FIG. 1) may be determined relative to an arbitrary datum point 18 (FIG. 1) which, in FIG. 1, is located at the nose at the forward end 14 (FIG. 1) of the aircraft 10. However, the center of gravity 60 may be determined relative to any arbitrary point at any location along the longitudinal axis 22 (FIG. 1) of the aircraft 10. The distance 62 (FIG. 1) of the center of gravity 60 from the datum point 18 may be determined by dividing the total moment of the two (2) main landing gear 42 and the nose landing gear 40 by the total weight of the aircraft 10. The moment at the main landing gear 42 may be defined as the product of the upward force 90 (FIG. 10) at each main landing gear 42 and the distance 56 (FIG. 1) from the jack point 54 (FIG. 1) at the main landing gear 42 to the datum point 18. The moment at the nose landing gear 40 may be defined as the product of the upward force 90 at the nose landing gear 40 and the distance 58 from the jack point 54 at the nose landing gear 40 to the datum point 18.

Step 308 of the method 300 of FIG. 11 may include performing ground vibration testing of the aircraft 10 (FIG. 1). The ground vibration testing of the aircraft 10 may be performed after the determination of the weight and the center of gravity 60 (FIG. 1) of the aircraft 10 although the ground vibration testing may be performed prior to the determination of the weight and the center of gravity 60. During the ground vibration testing, predetermined input forces (e.g., vibration) may be applied to the aircraft 10 while the aircraft 10 is lifted off of the supporting surface 64 (FIG. 9) by the apparatuses 70 (FIG. 3). Sensors (not shown) such as accelerometers mounted at predetermined locations on the aircraft 10 may measure the dynamic response of the aircraft 10 to the input forces.

Advantageously, the apparatuses 70 (FIG. 3) as disclosed herein are relatively light weight such that the contribution of the mass of the apparatus 70 to the aircraft 10 (FIG. 1) is relatively small compared to the overall mass of the aircraft 10 for purposes of the ground vibration testing. Furthermore, the pivotable suspension of the lifting beams 140 (FIG. 6) from the pivotable hanger rods 120 as shown in FIG. 3 minimizes the effect of the apparatus 70 on the dynamic response of the aircraft 10 during the ground vibration testing. Additionally, the apparatus 70 as disclosed herein advantageously minimizes non-linearities that may otherwise be introduced into the dynamic response of the aircraft 10 during conventional testing methods where the tires 46 (FIG. 1) aircraft 10 are in direct contact with the shop floor. Advantageously, the apparatuses 70 facilitate the performing of the weight and balance analysis in a significantly reduced amount of time relative to the amount of time required using conventional methods wherein the aircraft 10 is rolled up ramped surfaces onto scales and then rolled back down after measurement. In this regard, the apparatus as disclosed herein reduces the level of risk of damage to the aircraft 10 associated with such conventional methods of performing the weight and balance analysis of an aircraft.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. An apparatus for supporting an aircraft during ground vibration testing, comprising:
 a plurality of lifting mechanisms mounted on a supporting surface, each lifting mechanism being configured to impart an upward force on a component of the aircraft for lifting the aircraft off of the supporting surface;
 a beam structure configured to be mounted to the plurality of lifting mechanisms;
 a lifting beam suspended from the beam structure;
 a jack fitting sized and configured to fit within a bore formed in a component of the aircraft at a jack point, the jack fitting having a lower surface and a shaft extending below the lower surface;
 a load cell having an upper surface and an opening, the jack fitting shaft extending through the load cell opening and into a bore associated with the lifting beam, the load cell upper surface being in bearing contact with the jack fitting lower surface; and
 the load cell determining a weight of the aircraft when the aircraft is lifted off the supporting surface.

2. The apparatus of claim 1, wherein:
 the jack point is associated with a landing gear of the aircraft.

3. The apparatus of claim 1, wherein:
 the beam structure comprises a pair of generally parallel hanger beams mounted to the lifting mechanism and arranged in spaced relation to one another;
 each one of the hanger beams having a hanger rod extending downwardly therefrom; and
 the lifting beam having opposing ends coupled to a hanger rod.

4. The apparatus of claim 3, wherein:
 the hanger rod is comprised of an upper portion joined to a lower portion by a threaded sleeve; and
 the threaded sleeve being adjustable to adjust a total length of the hanger rod.

5. The apparatus of claim 3, wherein:
 at least one strain measurement device mounted to a hanger rod and being configured to measure a strain in the hanger rod when the aircraft is lifted off the supporting surface.

6. The apparatus of claim 1, further comprising:
 a bearing block mounted to the lifting beam; and the load cell being interposed between the bearing block and the component.

7. An apparatus for supporting an aircraft for ground vibration testing, comprising:
- a plurality of pressure canisters supported on a supporting surface
- a pair of hanger beams, each hanger beam extending between and supported by a pair of the pressure canisters;
- a hanger rod extending downwardly from each one of the hanger beams;
- a lifting beam having opposing ends coupled to the hanger rods;
- a jack fitting sized and configured to fit within a bore formed in a component of the aircraft at a jack point of a landing gear, the jack fitting having a lower surface and a shaft extending below the lower surface;
- a compression load cell having an upper surface and an opening, the jack fitting shaft extending through the load cell opening and into a bore associated with the lifting beam, the load cell upper surface being in bearing contact with the jack fitting lower surface; and
- the load cell providing an indication of a weight of the aircraft when the aircraft is lifted off the supporting surface.

8. A method of ground vibration testing of an aircraft, comprising the steps of:
- engaging the aircraft with a plurality of load cells by performing the following at each jack point on the aircraft:
  - inserting a jack fitting into a bore formed in a component of the aircraft at each jack point;
  - interposing a load cell between each jack point and a lifting beam of a lifting mechanism located at the lack point;
  - inserting a shaft of the lack fitting through an opening in the load cell and into a bore associated with the lifting beam such that an upper surface of the load cell is in bearing contact with a jack fitting lower surface;
- lifting the aircraft off of a supporting surface using a plurality of the lifting mechanisms;
- determining a weight of the aircraft based on outputs of the load cells; and
- performing ground vibration testing of the aircraft.

9. The method of claim 8, further comprising the step of:
- determining a center of gravity of the aircraft.

10. The method of claim 9 wherein the aircraft has a plurality of landing gear, the method further comprising the steps of:
- determining a weight measurement at each one of the landing gear; and
- determining the center of gravity of the aircraft based on the weight measurement at each one of the landing gear.

11. The method of claim 8, further comprising the steps of:
- receiving the shaft in a bearing block mounted to the lifting beam.

12. The method of claim 8, further comprising the steps of:
- suspending the lifting beam with a pair of hanger rods, at least one of the hanger rods having a strain gauge mounted thereto; and
- verifying, using an output of the strain gauge, the weight determined by the load cells when the aircraft is lifted off of the supporting surface.

13. The method of claim 12, wherein at least one of the hanger rods is comprised of an upper portion and a lower portion joined by a threaded sleeve, the method further comprising the step of:
- adjusting a total length of the hanger rod using a threaded sleeve interconnecting the upper and lower rod portions.

* * * * *